United States Patent
Vogtmeier

(10) Patent No.: US 9,354,328 B2
(45) Date of Patent: May 31, 2016

(54) RADIATION DETECTOR WITH PHOTODETECTORS

(75) Inventor: Gereon Vogtmeier, Aachen (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 142 days.

(21) Appl. No.: 13/991,482

(22) PCT Filed: Dec. 12, 2011

(86) PCT No.: PCT/IB2011/055596
§ 371 (c)(1),
(2), (4) Date: Jun. 4, 2013

(87) PCT Pub. No.: WO2012/080927
PCT Pub. Date: Jun. 21, 2012

(65) Prior Publication Data
US 2013/0256538 A1    Oct. 3, 2013

(30) Foreign Application Priority Data

Dec. 13, 2010   (EP) .................................. 10194668

(51) Int. Cl.
*G01T 1/20* (2006.01)
(52) U.S. Cl.
CPC ............. *G01T 1/2006* (2013.01); *G01T 1/2008* (2013.01)
(58) Field of Classification Search
CPC ........................... G01T 1/2006; G01T 1/2008
USPC ........................................................ 250/366
See application file for complete search history.

(56) References Cited

U.S. PATENT DOCUMENTS

| | | | |
|---|---|---|---|
| 5,138,167 A * | 8/1992 | Barnes | 250/370.01 |
| 5,606,638 A | 2/1997 | Tymianski et al. | |
| 2002/0017612 A1 | 2/2002 | Yu et al. | |
| 2006/0067472 A1* | 3/2006 | Possin et al. | 378/98.9 |
| 2007/0075253 A1 | 4/2007 | Misawa et al. | |
| 2007/0108393 A1 | 5/2007 | Shoji et al. | |
| 2008/0142721 A1 | 6/2008 | Spahn | |
| 2008/0230709 A1* | 9/2008 | Tkaczyk | G01T 1/242 250/370.09 |

(Continued)

FOREIGN PATENT DOCUMENTS

DE         19711927 A1    9/1998
DE     102006015043 A1   11/2007

OTHER PUBLICATIONS

Binda, M., et al.; Squaraine-based Organic Photodetector Coupled to a scintillating Crystal for X-ray Sensing Applications; 2009; IEEE Nuclear Science Symposium Conf. Record; N28-7:1970-1973.

(Continued)

*Primary Examiner* — Christine Sung

(57) ABSTRACT

The invention relates to a radiation detector (100) comprising a scintillator group with for example two scintillator elements (120a, 120b) for converting incident primary photons (X, X') into secondary photons ($\lambda$, $\lambda$') according to a characteristic emission spectrum. Moreover, the detector comprises at least two photodetectors (130a, 130b) for converting said secondary photons into electrical signals, wherein said photodetectors have different absorption spectra and can be read out separately. According to a preferred embodiment of the invention, the photodetectors are organic photodetectors (130a, 130b). The scintillator elements (120a, 120b) and the photodetectors are preferably arranged in a stack one behind the other. Due to the at least two photodetectors (130a, 130b), additional information about incident primary radiation (X, X') can be collected.

18 Claims, 2 Drawing Sheets

(56) References Cited

U.S. PATENT DOCUMENTS

2008/0315106 A1 12/2008 Buchinsky
2010/0102242 A1 4/2010 Burr et al.
2010/0148072 A1 6/2010 Furst et al.

OTHER PUBLICATIONS

Bourzac, K.; A Cheap, Plastic X-Ray Imager; 2009; MIT Technology Review; http://www.technologyreview.in downloaded Aug. 26, 2010.

Brabec, C. J., et al.; Plastic Solar Cells; 2001; Adv. Funct. Mater.; 11(1)15-26.

Kingsley, J. W., et al.; Stability of X-Ray Detectors Based on Organic Photovoltaic Devices; 2010; IEEE Journal of Selected Topics in Quantum Electronics; 16(6)1770-1775.

Street, R. A., et al.; New materials and processes for flat panel X-ray detectors; 2003; IEE Proc.-Circuits Devices Syst.; 150(4)250-257.

* cited by examiner

RADIATION DETECTOR WITH PHOTODETECTORS

FIELD OF THE INVENTION

The invention relates to a radiation detector for detecting high-energy photons, said radiation detector comprising scintillators and photodetectors. Moreover, its relates to an examination apparatus with such a radiation detector.

BACKGROUND OF THE INVENTION

Radiation detectors for the detection of incident γ- or X-rays are inter alia used in medical imaging applications, for instance in X-ray CT scanners. From the US 2008/142721 A1, a particular radiation detector is known that comprises a scintillator material in which incident X-rays are converted into (visible) light, wherein said light is then detected by an organic photodetector. The organic photodetector is used as a cost-effective alternative to conventional anorganic semiconductor photodetectors.

SUMMARY OF THE INVENTION

In view of this background, it was an object of the present invention to provide alternative means for detecting radiation, said means preferably having an improved discrimination of radiation characteristics.

This object is achieved by a radiation detector according to a radiation detector for detecting high energy radiation, including a scintillator group with at least one scintillator element for converting primary photons of incident radiation into secondary photons according to a characteristic emission spectrum: and at least two photodetectors for converting said secondary photons into electrical signals, and the photodetectors have different absorption spectra and can be read out separately, and an apparatus according to an examination apparatus, particularly an energy resolved CT scanner or X-ray apparatus, comprising a radiation detector according to the radiation detector for detecting high energy radiation. Preferred embodiments are disclosed in the dependent claims.

According to its first aspect, the invention relates to a radiation detector for the detection of incident high-energy radiation, e.g. of (X-ray or γ-) photons with an energy higher than about 100 eV. The detector comprises the following components:
a) A scintillator group comprising at least one scintillator element, wherein said group (as well as the element) serves for converting primary photons of the incident radiation into secondary photons according to a characteristic emission spectrum. Regarding the used terminology, a "scintillator element" shall denote a spatially and/or physically unique, one-piece component, while the "scintillator group" may comprise a plurality of such components that may be located at different positions. As known to a person skilled in the art, the wavelength of secondary photons generated in a scintillator element is primarily dependent on the scintillator material, while the number of generated secondary photons (i.e. the intensity) is related to the energy deposited by the incident primary photon. For many known scintillator materials, the secondary photons will be from the visible spectrum or adjacent UV or IR regions.
b) At least two photodetectors for converting the aforementioned secondary photons into electrical signals, wherein the photodetectors have different absorption spectra and can be read out separately. The "absorption spectrum" of a photodetector describes the probability that a (secondary) photon is absorbed in dependence on the wavelength of this photon. Moreover, reading out the photodetector comprises the detection of the electrical signals generated therein, for example with the help of electrodes to which a voltage is applied.

By using at least two photodetectors with different absorption spectra, the described radiation detector allows to collect more information about the incidental primary photons. This will be explained in more detail below with respect to preferred embodiments of the invention.

According to one preferred embodiment of the invention, the overall emission spectrum of the scintillator group comprises at least two peaks. The relative intensity of secondary photons at the peak wavelengths may then provide additional information about the incident radiation, for example about the energy (wavelength) of the primary photons.

In a further development of the aforementioned embodiment, the absorption spectra of different photodetectors are optimized with respect to different ones of said peaks of the emission spectrum. The conversion efficiency and/or the absorption coefficient of one photodetector may for example be maximal for secondary photons having the wavelength of a first scintillator emission peak, while the conversion efficiency of another photodetector is maximal for secondary photons from a second emission peak. Electrical signals from such photodetectors will then allow to infer the (probable) wavelength of the corresponding secondary photon, which in turn provides information about the corresponding primary photon.

The photodetectors may preferably be realized as organic photodetectors. As known to a person skilled in the art, an organic photodetector comprises at least one region or layer with an organic material that can generate movable electrical charges (typically electron-hole pairs) by absorbing incident photons. The generated charges can then be detected by electrodes to which a suitable voltage is applied. An advantage of organic photodetectors is that they can cost effectively be produced. Moreover, their absorption characteristics can largely be tuned, for example by using an appropriate mixture of different organic materials. This allows for example the aforementioned optimization with respect to the emission peaks of the scintillator group.

The aforementioned organic photodetectors may in general comprise any organic material that is suited to absorb incident (secondary) photons and convert them into an electrical signal and/or that can support this process as a hole or electron transport material or as a dopant. As an example, an organic photodetector may comprise at least one organic material selected from the group consisting of:
  PEDOT (Poly(3,4-ethylenedioxythiophene),
  PSS (poly(styrenesulfonate)),
  P3HT (poly 3-hexylthiophene),
  PCBM (6,6-phenyl C61-butyric acid methyl ester),
  C60,
  ZnPc (Zinc phthalocyanine),
  MeO-TPD (N,N,N',N'-tetrakis(4-methoxyphenyl)-benzidine),
  p-NPB (N,N'-bis(Inaphthyl)-N,N-diphenyl-1,1'-biphenyl-4,4'-diamine),
  TTN,
  $F_4TCNQ$ (2,3,5,6-Tetrafluoro-7,7,8,8-tetracyanoquinodimethane),
  DCV5T (bis(2,2-dicyanovinyl)-quinquwthiophene),
  derivatives or modifications of the above substances.

Further appropriate organic materials may be found in literature (e.g. Ch. J. Brabec et al., "Plastic Solar Cells", Adv. Funct. Matter, 2001, 11, No. 1, pages 15-26).

The scintillator group and the scintillator element(s) may in general comprise any material that can convert incident primary photons in an energy range of interest with a desired efficiency into secondary photons. For example, the scintillator group or element(s) comprise at least one material selected from the group consisting of CsI, GOS ($Gd_2O_2S$), CWO ($CdWO_4$) and $SrI_2$.

According to another embodiment of the invention, the scintillator group comprises at least two materials with different emission spectra. Such a combination of two or more scintillator materials can for instance be used to provide the above-mentioned emission characteristics with at least two peaks. By using appropriate relative amounts of the scintillator materials, the resulting emission spectrum can be adjusted within a wide range.

In the aforementioned embodiment, the two different scintillator materials may be homogeneously distributed in one scintillator element, provided that this is technically feasible (the materials must for example be chemically compatible to allow for mixing). In a preferred embodiment of the invention, the different scintillator materials are however inhomogeneously distributed within the scintillator group and/or within a scintillator element. Different regions of the scintillator group (or of a single scintillator element) will then comprise different relative amounts of the two scintillator materials and will therefore have different emission spectra. This can be used to infer the location within the detector at which an incident primary photon was converted, because one and the same primary photon will yield different emissions of secondary photons in said different regions. In this way it is for example possible to increase the spatial resolution of the detector.

In the aforementioned embodiment with an inhomogeneous distribution of different scintillator materials, there may be (at least) one given direction along which the relative amount of one scintillator material increases monotonically. The local emission spectrum of such a scintillator element will therefore change along this direction. The increase of the relative amount of scintillator material will typically be discontinuous, corresponding to the transition between two blocks of different scintillator materials. If two scintillator materials can be mixed, a continuous increase of concentration of one scintillator material (i.e. a gradient) would also be possible.

In a preferred embodiment, the aforementioned direction along which the relative amount of one scintillator material increases monotonically may substantially be parallel or perpendicular to the nominal direction of incidence of primary photons. The "nominal direction of incidence" is defined by the design of the radiation detector (with its shielding elements, casing etc.). It typically corresponds to an axis of highest sensitivity and/or an axis of symmetry of the radiation detector. When a one- or two-dimensional array of scintillator groups with associated photodetectors is used, this array is typically arranged perpendicular to the "nominal direction of incidence".

If the direction along which the relative amount of one scintillator material increases monotonically is substantially parallel to the nominal direction of incidence, it will be possible to infer the depth at which an incident primary photon was converted into secondary photons. As high-energy primary photons will usually be converted deeper within a detector than low-energy primary photons, the depth of conversion may provide additional information about the energy of the primary photons. If said direction is substantially perpendicular to the nominal direction of incidence, the resulting emission of secondary photons will comprise information that might be used to increase the spatial resolution of the radiation detector.

The scintillator group may preferably comprise at least two scintillator elements with different emission spectra. As explained above, such scintillator elements can for instance be realized by composing them of different scintillator materials.

The aforementioned scintillator elements with different emission spectra are preferably arranged one behind the other in the nominal direction of incidence of the primary photons. Thus a stack of scintillator elements is formed, wherein primary photons of high energy will typically be converted deeper in the stack than low-energy photons.

According to another embodiment, the photodetectors are arranged one behind the other in the nominal direction of incidence of the primary photons. In this stacked arrangement, each of the photodetectors generates a signal for the same spatial position of a resulting image, i.e. for the same pixel. The stacked arrangement of the photodetectors may particularly be combined with the above-mentioned stacked arrangement of the scintillator elements. Most preferably, each photodetector is disposed most closely to "its" scintillator element, i.e. the scintillator element with the matching emission spectrum.

The radiation detector may further optionally comprise at least one reflective layer that reflects secondary photons. Most preferably, this reflective layer is transparent for the incident primary photons. The reflective layer helps to avoid losses of secondary photons and thus to increase the sensitivity of the radiation detector.

According to another embodiment, the radiation detector comprises a substrate with electrical lines for contacting the photodetectors. The substrate may for example comprise a semiconductor material and serve as a mechanical carrier of the other components. Moreover, the substrate may optionally comprise some (simple) circuits for signal (pre-) processing.

The invention further relates to an examination apparatus for the examination of an object (e.g. a patient) with radiation, said apparatus comprising a radiation detector of the kind described above. The examination apparatus may particularly be applied as a baggage inspection apparatus, a material testing apparatus, a material science analysis apparatus, or a medical application apparatus. The examination apparatus may especially be selected from the group consisting of an X-ray apparatus (e.g. a fluoroscopic device, spectral X-ray apparatus), Computed Tomography (CT) imaging system (e.g. a photon-counting and/or Spectral CT imaging system), Coherent Scatter Computed Tomography (CSCT) imaging system, Positron Emission Tomography (PET) imaging system, and Single Photon Emission Computerized Tomography (SPECT) imaging system. It should be noted that some of these applications require that the photodetectors have specific characteristics (e.g. that they are fast enough in case of photon-counting applications).

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers or numbers differing by integer multiples of 100 refer in the Figures to identical or similar components.

DESCRIPTION OF PREFERRED EMBODIMENTS

Figure 1:
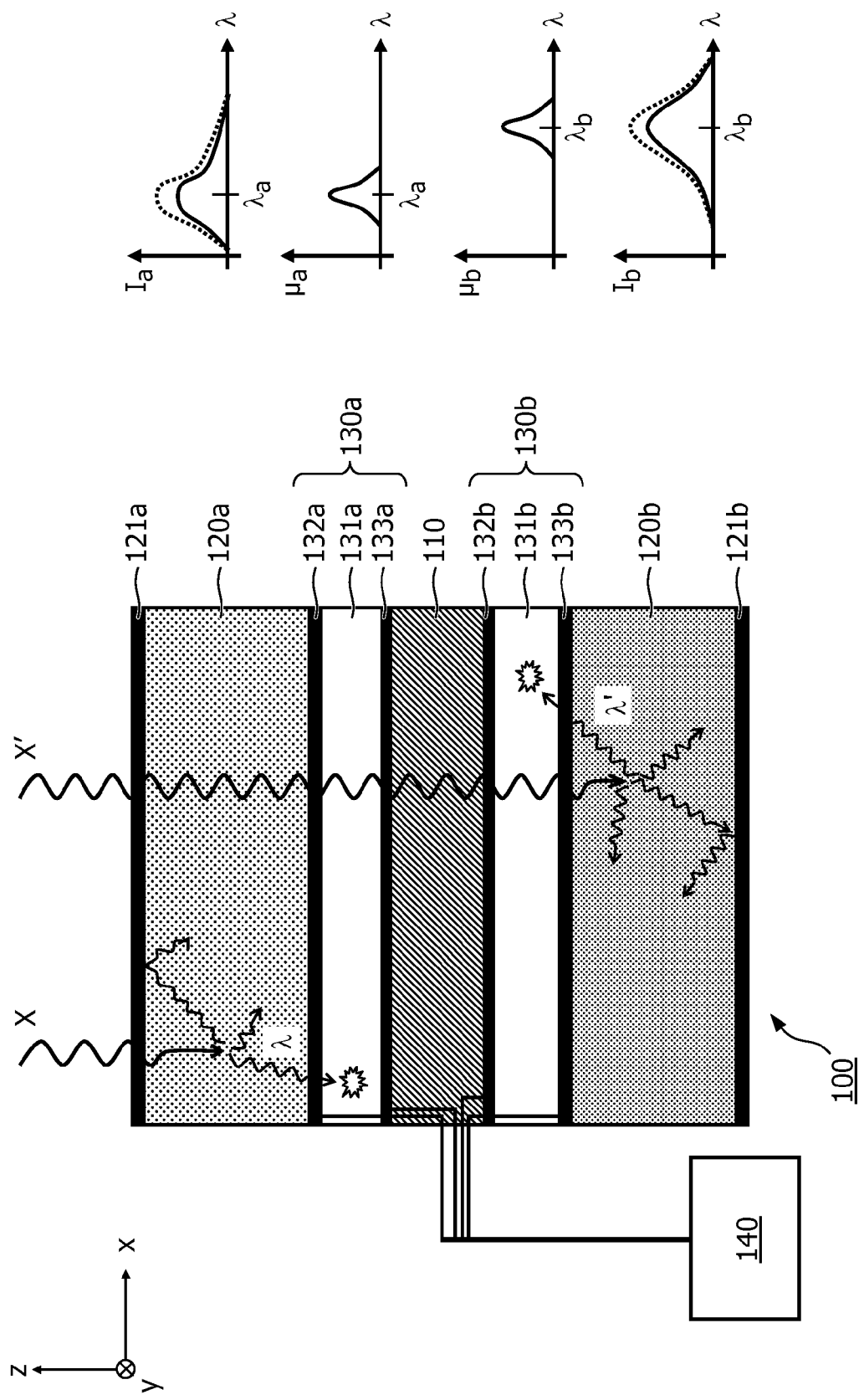
FIG. 1 schematically shows a side view of a radiation detector according to a first embodiment of the present invention, in which layers are arranged symmetrically with respect to a substrate.

FIG. 1 shows a schematic cross section through a radiation detector 100 according to a first embodiment of the present invention. The radiation detector 100 serves for the detection of incident X-radiation, which is represented in the drawing by a primary photon X of lower energy and a primary photon X' of higher energy. The X-radiation is substantially parallel to a nominal direction of incidence, which corresponds to the viewing direction of the radiation detector (z-direction).

The radiation detector 100 comprises a scintillator group which consists of two scintillator elements 120a and 120b that are arranged at the top and at the bottom of the radiation detector, respectively. In the scintillator elements 120a, 120b, the incidental primary photons X, X' interact with the scintillator material, thus converting their energy into a flash of (many) secondary photons $\lambda$, $\lambda'$.

On the right next to each scintillator element 120a, 120b, the corresponding emission spectrum is schematically sketched. It represents the intensity $I_a$, $I_b$ of generated secondary photons $\lambda$, $\lambda'$ in independence on their wavelength $\lambda$. The emission spectrum of each single scintillator element 120a and 120b typically has one more or less sharp peak at a characteristic wavelength $\lambda_a$ and $\lambda_b$, respectively. The height of these peaks typically depends on the energy that was deposited by the converted primary photon.

The two scintillator elements 120a, 120b are composed of different scintillator materials. The corresponding emission spectra are hence different, having emission peaks at different wavelengths $\lambda_a \neq \lambda_b$. Primary photons $\lambda$ that are converted in the upper scintillator element 120a will therefore generate secondary photons $\lambda$ distributed around the first wavelength $\lambda_a$, while primary photons X' converted in the bottom scintillator element 120b will generate secondary photons $\lambda'$ distributed around the second wavelength $\lambda_b$.

Below the upper scintillator element 120a (seen in the nominal direction of incidence) and above the lower scintillator element 120b, the radiation detector 100 comprises two organic photodetectors 130a and 130b, respectively. As known to a person skilled in the art, the organic photodetector 130a (130b) comprises an organic layer 131a (131b) in which incident secondary photons $\lambda$ ($\lambda'$) are converted into electrical signals, particularly into movable electrical charges. The organic materials may for example comprise PEDOT:PSS, P3HT:PCBM, ZnPc and/or C60, and they may be applied by spin coating, doctor blading, or spray coating. Two electrodes 132a and 133a (132b, 133b) are disposed on opposite sides of the organic layer 131a (131b). When a voltages is applied to them, the generated charges are collected and thus yield an electrical (charge) signal in the lines that connect the electrodes to a readout unit 140. This electrical signal can be evaluated, for example be counted and/or integrated, wherein the integral provides information about the total energy deposited by the incident primary photon X (X').

On the right next to each photodetector 130a, 130b, the absorption spectrum of that organic photodetector is schematically shown, represented by the absorption coefficient $\mu_a$, $\mu_b$ in dependence on the wavelength $\lambda$ of incident secondary photons (the absorption coefficient $\mu$ is as usually defined as the constant characterizing the exponential decrease of light intensity I(z) after traveling a distance z through a considered material according to the formula $I(z)=I_0 \exp(-\mu z)$). The absorption spectra of the two photodetectors 130a, 130b are different, showing a peak at different wavelengths $\lambda_a$ and $\lambda_b$, respectively. Hence the absorption spectrum of the upper photodetector 130a matches the emission spectrum of the upper scintillator element 120a, while the absorption spectrum of the lower photodetector 130b matches the emission spectrum of the lower scintillator element 120b. Together with the spatial neighborhood of scintillator elements and photodetectors, this matching of emission and absorption peaks is the reason that the upper photodetector 130a primarily detects secondary photons $\lambda$ originating in the upper scintillator element 120a, while the lower photodetector 130b primarily detects secondary photons $\lambda'$ originating in the lower scintillator element 120b. This association is particularly close if the two absorption spectra of the photodetectors 120a, 120b have little or no overlap and/or the emission spectra of the scintillator elements 120a, 120b have little or no overlap.

The photodetectors 130a, 130b are disposed on opposite sides of a substrate 110, for example a semiconductor material like silicon. The substrate 110 serves as a mechanical carrier and provides electrical lines that contact the electrodes 132a, 133a, 132b, 133b of the photodetectors 130a, 130b. The electrical lines within the stack of photodetectors and scintillator elements are preferably transparent to avoid absorption of secondary photons $\lambda$, $\lambda'$. They may for example be made from ITO (indium tin oxide). Furthermore, the substrate 110 should be transparent for the primary photons X, X'.

Moreover, reflective layers 121a and 121b may preferably be disposed on the outside of the scintillator elements 130a and 130b, respectively, to reflect secondary photons $\lambda$, $\lambda'$ back into the detector. At least the upper reflective layer 121a should of course be transparent for the primary photons X, X'.

Figure 2:
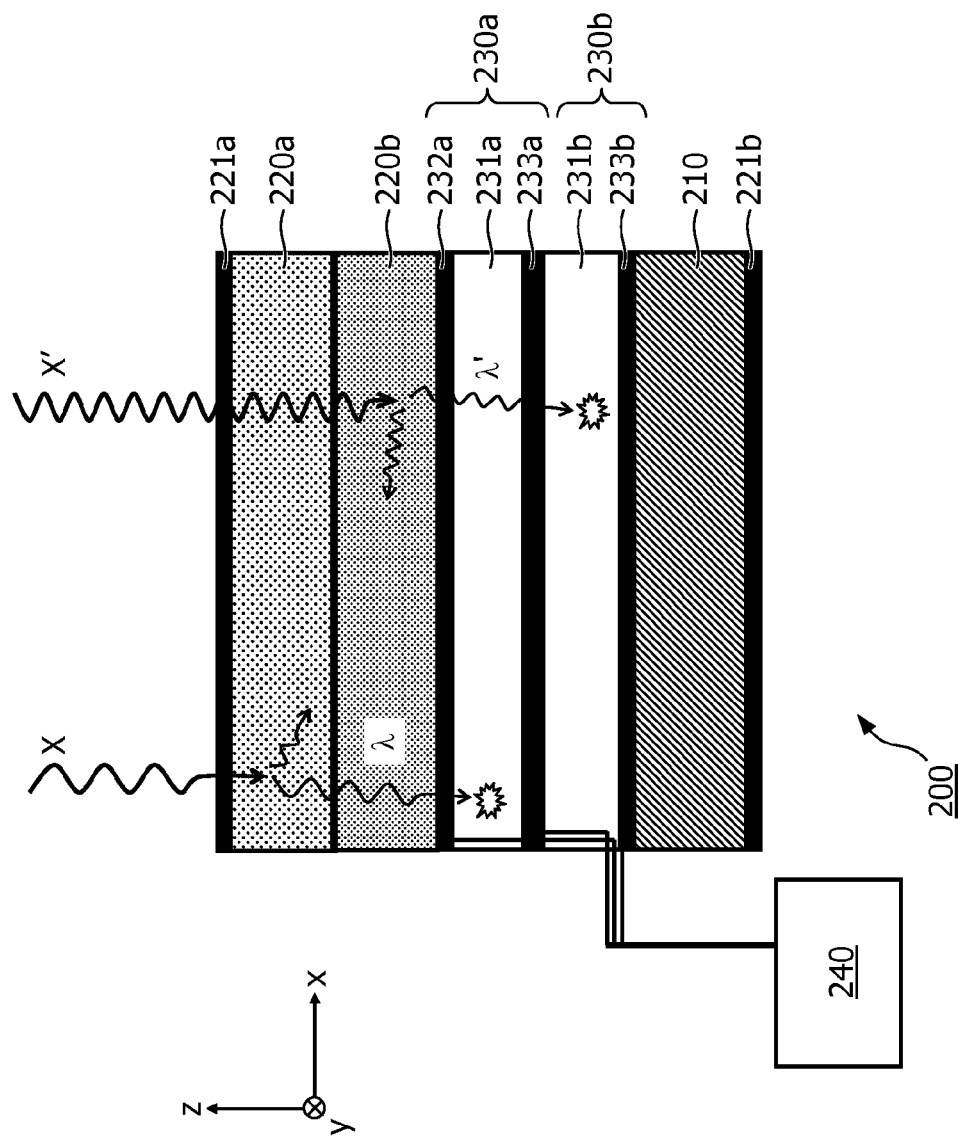
FIG. 2 schematically shows a side view of a radiation detector according to a second embodiment of the present invention, in which layers are stacked above a substrate.

FIG. 2 illustrates schematically a radiation detector 200 according to a second embodiment of the invention. The difference with respect to the first radiation detector 100 is that all components are disposed on one side of the substrate 210. More specifically, the radiation detector 200 comprises, from top to bottom:

A first reflective layer 221a.
A first scintillator element 220a having a first emission spectrum.
A second scintillator element 220b having a second emission spectrum different from the first one.
A first photodetector 230a having a first absorption spectrum that matches the first emission spectrum.
A second photodetector 230b having a second absorption spectrum that matches the second emission spectrum.
The substrate 210.
A second reflective layer 221b (optional).

The functionality of the mentioned components is substantially the same as for the first radiation detector of FIG. 1 and will therefore not be explained again.

The known production technology for organic solar cells and/or for OLEDs can be applied in the context of the present invention, too. It should however be noted that FIGS. 1 and 2 show just one cell or pixel of a large array of pixels extending in x- and y-direction. Such an array structure can for instance be produced with the help of printing technologies as well as with (laser) structuring technologies using masks and connection line arrays that will be deposited with the required materials according to the material stack. Special attention should be kept on the radiation hardness of the different materials.

An important advantage of the used organic materials in the photodetectors is the option to use different conversion materials in the scintillator group that have different conversion efficiencies at a certain wavelength. So it is possible to optimize the absorption spectrum of the photodetector material with the emission spectrum of the scintillator material in an X-ray conversion detector system. The responsivity is increased by using different organic conversion materials in a double or even triple layer structure where several emission peaks of the scintillator can be used (for multiple energy X-ray). Measurements with the described detector designs show for dedicated wavelengths a higher efficiency compared to silicon reference diodes.

It should further be noted that the described embodiments can be modified in many ways. The electrodes 232a, 233a, 233b (or 132a, 133a, 132b, 133b) of the photodetectors could for example be arranged on other sides of the organic layers, particularly on their side faces. Moreover, a continuous distribution of two different scintillator materials in one scintillator element could be used instead of the complete separation of the scintillator materials into two scintillator elements 220a, 220b (120a, 120b). Such a continuous distribution could particularly be inhomogeneous and for example have a concentration gradient of one material in a given direction.

Furthermore, there could be any other number of scintillator elements and/or photodetectors. The arrangement of two or more different scintillator elements and/or photodetectors could additionally or alternatively take place in a direction perpendicular to the nominal direction of incidence (i.e. in x- or y-direction). In this case the different emission and/or absorption characteristics would provide additional information about the spatial position of incident primary photons X, X'.

In summary, the invention relates to a radiation detector comprising a scintillator group with for example two scintillator elements for converting incident primary photons into secondary photons according to a characteristic emission spectrum. Moreover, the detector comprises at least two photodetectors for converting said secondary photons into electrical signals, wherein said photodetectors have different absorption spectra and can be read out separately. According to a preferred embodiment of the invention, the photodetectors are organic photodetectors. The scintillator elements and the photodetectors are preferably arranged in a stack one behind the other. Due to the at least two photodetectors, additional information about incident primary radiation can be collected. An essential feature of the invention is the matching of the different spectra and the selection of the right organic material to form an optimized system with high efficiency and low cost. This allows a stacked design for multiple energy detection.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A radiation detector for detecting high-energy radiation, comprising:
a scintillator group of a plurality of scintillator elements with at least two scintillator elements of the plurality of scintillator elements, including a first scintillator element configured to convert first energy primary photons of incident primary radiation into first secondary photons according to a first characteristic emission spectrum of the first scintillator element, which includes a first peak, and a second scintillator element configured to convert second different energy primary photons of incident primary radiation into second secondary photons according to a second different characteristic emission spectrum of the second scintillator element, which includes a second different peak;
at least two photodetectors, including a first photodiode configured to convert said first secondary photons into first electrical signals and a second photodiode configured to convert said second secondary photons into second electrical signals, wherein each photodetector includes a first electrode disposed on one side and a second electrode disposed on an opposite side; wherein said photodetectors have different absorption spectra and read out emission with a voltage applied across the first electrode and the second electrode; and
wherein the at least two photodetectors are transparent to the incident second different energy primary radiation.

2. The radiation detector according to claim 1, wherein the first and second photodetectors are arranged with one of the first and second photodiodes between another of the first and second photodetectors and at least one of the first and second scintillator elements.

3. The radiation detector according to claim 1, wherein the first and second photodetectors are organic photodetectors.

4. The radiation detector according to claim 3, wherein at least one of the organic photodetectors comprises an organic material selected from the group consisting of PEDOT, PSS, P3HT, PCBM, C60, ZnPc, MeO-TPD, p-NPB, TTN, F4TCNQ, DCV5T and derivatives or modifications thereof.

5. The radiation detector according to claim 1, wherein the scintillator group comprises at least one material selected from the group consisting of CsI, GOS, CWO and $SrI_2$.

6. The radiation detector according to claim 1, wherein the scintillator group comprises at least two materials with different emission spectra.

7. The radiation detector according to claim 1, wherein the first and second scintillator elements are arranged one behind the other in a nominal direction of incidence of the primary photons.

8. The radiation detector according to claim 1, wherein the first and second photodetectors are arranged one behind the other in a nominal direction of incidence of the primary photons.

9. The radiation detector according to claim 1, further comprising at least one reflective layer that reflects secondary photons.

10. The radiation detector according to claim 1, wherein it comprises a substrate with electrical lines for contacting the photodetectors.

11. An energy resolved CT scanner or X-ray apparatus, comprising a radiation detector according to claim 1.

12. The radiation detector according to claim 1, wherein each of the first and second photodetectors includes a separate electrical connection to a read-out unit.

13. The radiation detector according to claim 12, wherein the first and second electrodes of each photodetector send separate electrical signals to the read-out unit.

14. A radiation detector for detecting radiation, comprising:
- a scintillator group which comprises a first scintillator element and a second scintillator element, and the first scintillator element is configured to emit photons of a first wavelength in response to a radiation photon of a first energy, and the second scintillator element is configured to emit photons of a second wavelength in response to a radiation photon of a second energy different from the first energy;
- a first photodetector configured to convert the photons of the first wavelength into first electrical signals with a voltage applied across a first electrode disposed on a first side of the first photodetector and a second electrode disposed on a second side of the first photodetector opposite the first electrode, and the first and second electrodes are connected to a read-out unit which receives the first electrical signals;
- a second photodetector configured to convert the photons of the second wavelength into second electrical signals with a voltage applied across a third electrode disposed on a first side of the second photodetector and a fourth electrode disposed on a second side of the second photodetector opposite the third electrode, and the third and fourth electrodes are connected separately to the read-out unit which receives the second electrical signals; and
- wherein the first photodetector and the second photodetector are transparent to the radiation photons of at least one of the first energy or the second energy.

15. The radiation detector according to claim 14, wherein each of the first and second photodetectors are organic photodetectors.

16. A radiation detector for detecting high-energy radiation, comprising:
- a scintillator group of a plurality of scintillator elements configured to convert primary photons of primary incident radiation into secondary photons according to a characteristic emission spectrum which includes different peaks corresponding to each of the scintillator elements;
- a plurality of photodetectors configured to convert the secondary photons into electrical signals and are transparent to primary incident radiation corresponding to at least one of the different peaks, wherein each photodetector includes a first electrode disposed on one side and a second electrode disposed on an opposite side, and each photodetector has a different absorption spectra and reads out emission from one of the different peaks separately with a voltage applied across the first electrode and the second electrode.

17. The radiation detector for detecting high-energy radiation according to claim 16, wherein the plurality of photodetectors are organic photodetectors.

18. The radiation detector for detecting high-energy radiation according to claim 17, wherein the plurality of photodetectors are arranged with at least two photodetectors disposed in between one of the plurality of scintillator elements and another of the plurality of scintillator elements.

* * * * *